Figure 1:
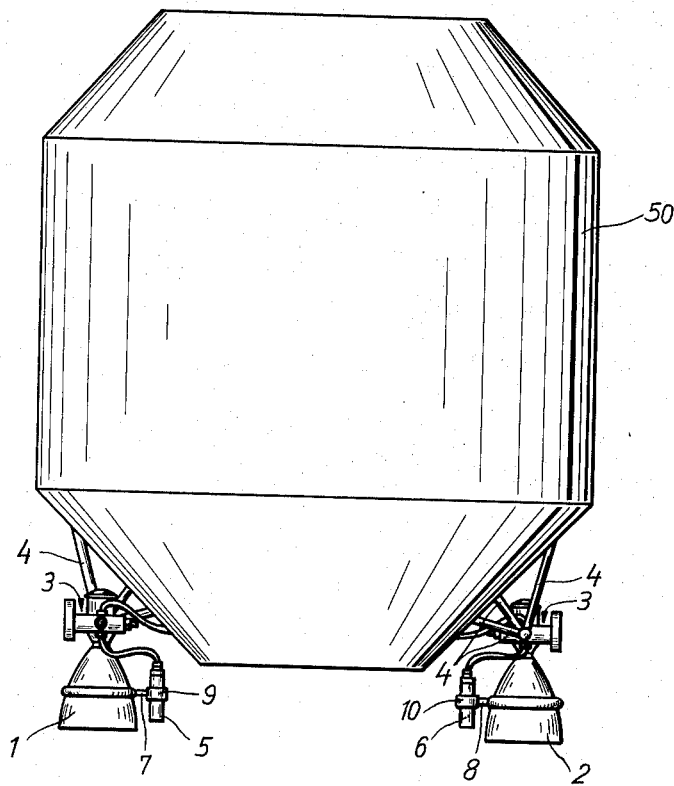

Jan. 25, 1966          D. E. KOELLE          3,231,224

FLUID THRUST ATTITUDE CONTROL SYSTEM FOR SPACE VEHICLES

Filed Jan. 23, 1964          2 Sheets-Sheet 1

Inventor
Dietrich E. Kölle

By *McGlew and Toren*

Attorneys

Jan. 25, 1966 D. E. KOELLE 3,231,224
FLUID THRUST ATTITUDE CONTROL SYSTEM FOR SPACE VEHICLES
Filed Jan. 23, 1964 2 Sheets-Sheet 2

Inventor
Dietrich E. Kölle
By  Mulflow and Toren
Attorneys

United States Patent Office 3,231,224
Patented Jan. 25, 1966

3,231,224
FLUID THRUST ATTITUDE CONTROL SYSTEM FOR SPACE VEHICLES
Dietrich Eckard Koelle, Munich, Germany, assignor to Bölkow Gesellschaft mit beschrankter Haftung, Munich, Germany
Filed Jan. 23, 1964, Ser. No. 339,775
Claims priority, application Germany, Jan. 30, 1963, B 70,541
10 Claims. (Cl. 244—52)

This invention relates in general to space vehicle construction, and in particular to a new and useful control device for adjusting the space position of a space vehicle, particularly in the powerless flight stage.

The course of a space vehicle depends to a great extent on the climbing path during the lower supporting stages. The orbiting path which the space vehicle will assume generally depends on the main drive and control system of the space vehicle. This drive and control operates during the climbing path to the orbital location but is usually put out of operation when the desired orbital path is achieved, so that the space vehicle flies not only without power, but also without control. In practice, the calculated and desired orbit for a space vehicle is not always achieved, and, in addition, the position of the space vehicle changes in space without control. Therefore, it is necessary to make both orbit corrections and space position corrections at the transition stages after the main drive for the vehicle has been disconnected and before this main drive is re-ignited. When liquid propulsion units are employed for the main driving and controlling systems, the fuels will be suspended weightless in the tanks when there is no thrust acceleration and ignition of the propulsion units is not easily accomplished.

In order to eliminate the above-mentioned disadvantages and to be able to adjust both the position and the orbit of a space vehicle and to insure re-ignition of the main propulsion unit, it is known to employ space vehicles with fixed non-pivotal propulsion units to provide a secondary control system. Such units usually consist of six to eight supplemental nozzles which are mounted in a fixed position or can only turn in a single plane with four of the nozzles effecting the yawing and pitching motions, and two of the nozzles effecting the roll stabilizing motions. The remaining nozzles are to accelerate the space vehicle in order to bring the fuel from the tank to the engine suction pipe before the main propulsion units are re-ignited. Such an arrangement permits position adjustment and orbit correction during the powerless flight stage and also makes it possible to re-ignite the main propulsion unit. However, the secondary systems all have the disadvantage that they require a separate control and/or an adjusting system, and, thus, require considerable additional parts and techinical arrangements and installations which impair the useful load and height capabilities of the vehicle, as well as the reliability thereof.

In accordance with the present invention, there is provided a control device which does not have the disadvantages of the prior art structures. A control according to the invention includes a secondary thrust device mounted on the propulsion units of the vehicle, which units are pivotally mounted. The control device includes means for generating thrust of relatively small magnitude by means of jet reaction, and which means advantageously operates from a fuel supply fluid maintained in a separate, independently pressurized chamber. The device and system advantageously are of very small size and with a minimum of weight, space and structural parts, permitting generation of control impulses about all axes of the space vehicle to permit the performance of difficult space flight maneuvers, such as a Hohman passage, rendezvous technique and similar difficult orbital maneuvers, as well as permitting re-ignition in space when using liquid engines. The system advantageously operates independently of the adjustment system of the main and control propulsion system and the thrust device itself is advantageously mounted on each of the pivotal propulsion units preferably parallel to the axis of thrust of each of the units with which it is associated. The system may advantageously be put into operation either automatically, for example by accidental rotations, or upon a signal.

The control device of the invention has the great advantage that it permits easy re-ignition of the main and control propulsion units with resultant fuel savings and permits higher orbital paths with greater useful loads and with a continuous driving orbit. In the power phase the control of the space vehicle is effected substantially by the pivotal main and control propulsion units, respectively, but minor orbit and position corrections can be effected in powerless flight phase by the small jet reaction device provided by the invention.

Accordingly, it is an object of this invention to provide an improved device for controlling space vehicles.

A further object of the invention is to provide a device for controlling space vehicles, particularly in the powerless flight stage during orbit, which comprises separate thrust generating means mounted in association with a pivotal main propulsion and/or control engine and connected to means for separatively supplying thrust producing fluids.

A further object of the invention is to provide a separate relatively low thrust generating device which is associated with at least one of a plurality of pivotally mounted main thrust engines and which is connected to means such as a pressurized liquid fuel supply for generating thrust gases which are advantageously discharged parallel to the axis of the associated main thrust engine.

A further object of the invention is to provide a control system for a space vehicle which is simple in design, rugged in construction and economical to manufacture.

The various features of novelty which characterize the invention are pointed out with particularly in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 2:
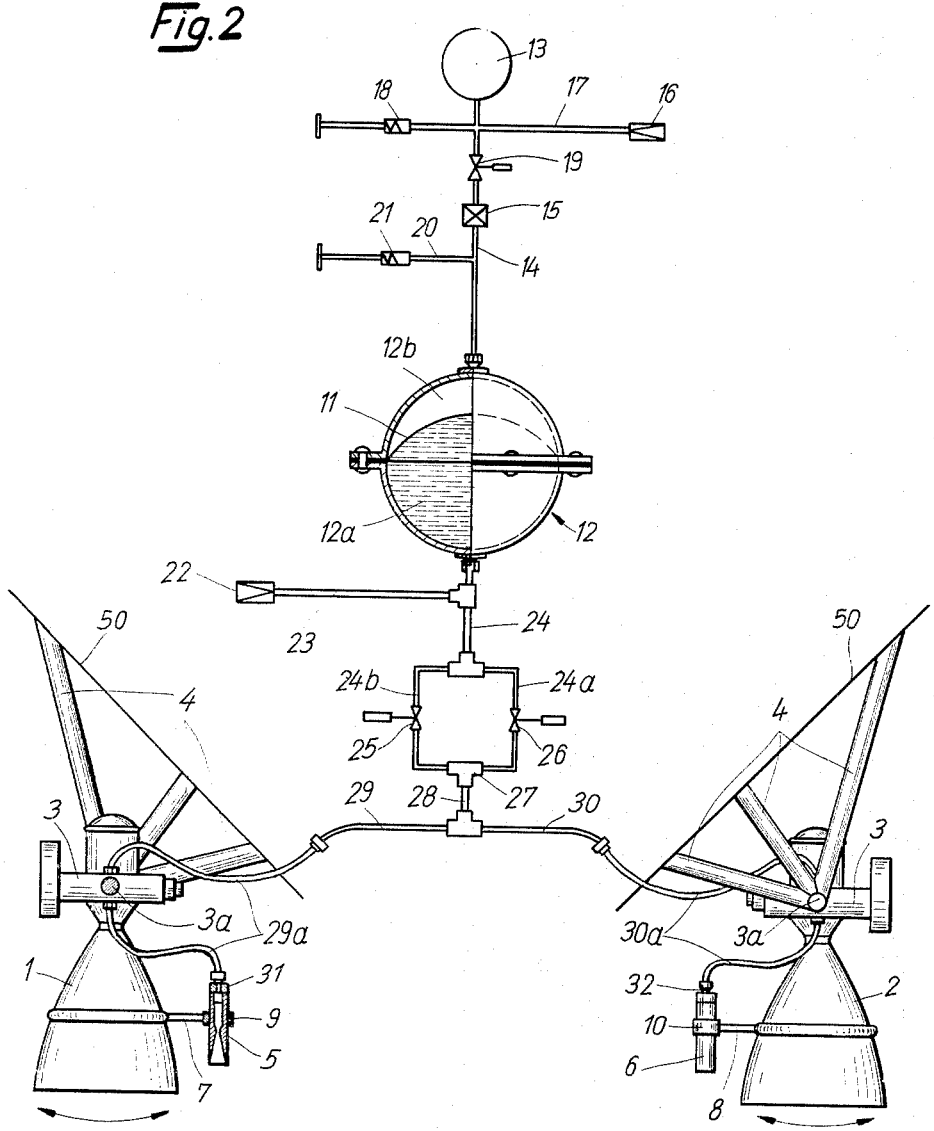

In the drawings:

FIG. 1 is a side elevation of a space vehicle having a control device constructed in accordance with the invention; and FIG. 2 is a schematic representation of the fuel supply system for the secondary propulsion unit indicated in FIG. 1.

Referring to the drawings in particular, the invention embodied therein comprises a space vehicle 50 having main propulsion units or thrust engines 1 and 2 carried on a universal pivot mounting on diametrically opposite sides thereof. The thrust engines are supported on a central axis member 3a of a Cardan or universal joint 3. Strut elements indicated 4 extend outwardly from the lower conical wall portion of the vehicle 50 and provide a mounting bracket or support for the universal joints 3, 3.

In accordance with the invention, a control device for adjusting the position of the space vehicle 50 includes low thrust generating devices or propulsion units 5 and 6 which are secured in holding devices 9 and 10 held by mounting brackets or projecting arms 7 and 8, respectively, to associated main propulsion units 1 and 2, respectively. The arms 7 and 8 hold the respective propulsion units 5 and 6 with their axis of thrust extending substantially parallel to the axis of thrust of the associated main propulsion or control units 1 and 2.

The thrust generating devices 5 and 6 are provided, in the embodiment illustrated, with separate fuel supply systems which are distinct from the supply systems for the main propulsion units 1 and 2 and which work independently of the gravitation and acceleration conditions acting on the vehicle.

The thrust generating devices 5 and 6 are preferably liquid propulsion units. Because the thrust generating devices 5 and 6 are rigidly connected with the pivotal main propulsion units 1 and 2 and may be moved therewith, it is not necessary to provide special adjusting systems for such units. The same control which is operated for shifting the propulsion units 1 and 2 about their universal pivotal mounting when the space vehicle is in the driven flight phase can be employed for the control of the space vehicle during the operation of the thrust generating devices 5 and 6 and after the main combustion engines 1 and 2 are shut off. Thus, it can be readily seen that the thrust devices 5 and 6 can provide a preliminary acceleration for the re-ignition of the main propulsion units and also can give off any correcting thrust in order to position the space vehicle or correct the orbit thereof.

In the embodiment indicated, in order to insure optimum efficiency and savings in weight and space, and uniform fuel supply and reliability of the devices 5 and 6, the fuel supply for the units is incorporated in a separate fuel system. As indicated in FIG. 2, this system includes a tank 12 which is subdivided by a flexible diaphragm 11. In the embodiment indicated, a liquid fuel which is a monergolic fuel, is admitted to a lower chamber or fuel portion 12a while the upper chamber or gas portion 12b on the opposite side of the diaphragm is supplied with a gas under pressure. By maintaining the fuel in chamber 12a under pressure produced by the pressure gas in chamber 12b acting on the diaphragm 11, the system will operate independently of any gravitational or acceleration conditions acting on the vehicle 50.

The pressure of the gas in the chamber 12b exerts a constant pressure on the fuel in the chamber 12a, which may be adjusted, as desired, by a pressure regulator 15 which is arranged by line 14 leading from the chamber 12b to a pressure gas reservoir 13. The charging of the reservoir 13 with a pressure gas is effected through a filling sleeve 16 in a connection pipe 17. The connection pipe 17 also carries a release valve 18. A pressure regulator 15 is arranged in the line 14 along with a main valve 19 which controls the supply of pressure gas to the tank 12. The valve 19 may be completely closed, if necessary. Another relief valve 21 is arranged in the branch line 20 between the pressure regulator 15 and the tank 12 in order to provide an additional insurance that the gas pressure cannot exceed an admissible value, if, for example, the first relief pressure valve 18 should fail.

The filling of the fuel compartment 12a with fuel is effected from a filling connection or sleeve 22 which is arranged at the end of a pipe 23. The pipe 23 connects to a fuel supply pipe 24 which extends from the chamber 12a to a branch or dividing connection leading to branch lines 24a and 24b. Each of the branch lines 24a and 24b carries a fuel valve 26 and 25, respectively, and both lines are connected at their opposite ends to a distributor 27 and a central pipe 28 which connects to line 29, leading to the thrust device 5, and to line 30, leading to the thrust device 6. Lines 29 and 30, or a portion thereof, are made flexible to permit the lines to move along with the movement of the thrust generating devices 5 and 6 with the pivoting of the main engines 1 and 2. In the embodiment illustrated, the portions 29a and 30a are made flexible, and the thrust devices include non-return valves or one-way check valves 31 and 32 which permit flow only into the thrust devices and not backwardly through the lines 29a and 30a.

The thrust generating devices 5 and 6 advantageously include means for igniting a liquid fuel when this type of fuel is provided. Such means are arranged to effect easy ignition at any time quickly and reliably in all flight positions of the vehicle and independently of the gravitational or acceleration conditions. By using a monergolic fuel in a preferred embodiment of the invention, it is possible to achieve a thrust in a simple and easy manner. If only low impulse outputs are required of the thrust devices 5 and 6, the thrust devices are connected directly through lines 29 and 30 to a pressure gas, for example nitrogen or helium, instead of with a monergolic fuel. The pressure gas which is directed through the nozzle portion of each device 5 and 6 will produce the necessary low thrust in its expansion.

Without adding materially to the weight of the vehicle, a sufficient amount of gas, cold or hot gas, can be carried in these secondary systems and in separate tanks, or, if a pressure gas fuel delivery system is used in the main propulsion unit, the gas may be taken from the existing pressure gas tanks. The present invention provides a system which is very simple not only in respect to the savings in weights, but also in respect to the operating elements which are required. The system permits the elimination, for example, of separate ignition devices and catalysts and all special tanks or fittings are pertinent thereto. The entire secondary control system for controlling the space vehicle consists then substantially only of the two gas nozzles with means, such as a one-way valve, for insuring that discharge is only outwardly in a desired thrust direction.

With higher impulse outputs which are required, for example, for the production of a sufficient preliminary acceleration, it is possible to employ a monergolic fuel with the separate supply system, as indicated in FIG. 2. The impulse output required for such control is relatively low, but it suffices for a position correction of the space vehicle within the necessary limits. In more difficult space flight maneuvers, such as a rendezvous or major orbit manuvers, it is advantageous to have the thrust devices 5 and 6 operate as propulsion units employing fuel on a two substance basis. Both hypergolic fuels which make an ignition system dispensable, and non-hypergolic fuels can be fed to the propulsion units from separate tanks, such as the tank 12.

Independently of the design of the secondary control system according to the invention, and independently of the type of jet reaction systems and/or whether two or more pivotal propulsion units are provided as main propulsion and control system, advantages provided by the invention, particularly with regard to low weight and technical expenditures, are possible. This is so because the jet reaction systems are rigidly mounted directly on the pivotal propulsion units so that they do not require special adjusting mechanism. In addition, the control device according to the invention requires only the relatively simple thrust devices and a minimum of structural parts with low space requirements therefor, and also permits adequate control for all flight requirements.

While specific embodiments of the invention have been shown and described in detail to illustrate the application of the inventive principles, it will be understood that the invention may be embodied otherwise without departing from such principles.

What is claimed is:

1. A control for adjusting the space position of a space vehicle particularly in a powerless flight phase, comprising at least two diametrically arranged and universally pivotal main and control propulsion units adapted to be mounted on said space vehicle, a secondary propulsion unit system working independently of gravitation and acceleration conditions for generating thrust impulses for controlling the space position mounted on each of said pivotal main and control propulsion units in a position for discharging thrust gases for the control of the space vehicle, said secondary propulsion unit system including a jet reaction element which is pivotal with said main and control propulsion units.

2. In a space vehicle including at least one main propulsion unit pivotally mounted in a manner permitting the direction of thrust gases in a plurality of directions, the improvement comprising: a thrust generating device for producing thrust gases of relatively small magnitude mounted on said main propulsion unit, and means connected to said thrust device and to the interior of said space vehicle for supplying said thrust device with means for producing thrust gases for discharge from said device, said thrust device being movable with said main propulsion device with which it is associated whereby the thrust gases may be directed in a plurality of directions.

3. In a space vehicle including first and second propulsion units, means mounting said first and second propulsion units for pivotal movement in all directions on said space vehicle, the improvement comprising: a control thrust gas producing device mounted on each of said first and second propulsion units for pivotal movement therewith, and supply means on said vehicle connected to each of said control thrust gas producing devices for producing thrust gases at said device, said thrust gas producing devices having a discharge for discharging thrust gases in a selected direction in accordance with the orientation of the respective propulsion unit with which it is associated.

4. In a space vehicle according to claim 3, wherein said supply means includes a fuel tank, a diaphragm dividing said tank into a fuel chamber and a pressure chamber, conduit means connecting said fuel tank fuel chamber with said thrust gas producing device for delivering fuel to said device for the generation of thrust gases, and means for supplying pressure gas to said pressure chamber of said fuel tank.

5. In a space vehicle according to claim 4, including a pressure gas tank connected to the pressure chamber of said fuel tank, and valve regulating means in the connection between said pressure gas tank and said pressure gas chamber of said fuel tank.

6. In a space vehicle according to claim 4, wherein said conduit means connecting between said fuel tank and said control thrust gas producing devices includes first and second branch conduits, and a third conduit connected centrally to said branch conduits and to said fuel tank, and a filling connection connected to said third conduit.

7. In a space vehicle according to claim 3, wherein said thrust gas producing device comprises a nozzle.

8. In a space vehicle according to claim 4, wherein said thrust gas producing device comprises a reaction engine, said supply means including means to supply fuel to said reaction engine.

9. In a space vehicle according to claim 3 wherein said supply means includes a fuel supply system comprising a fuel tank, a diaphragm dividing said tank into a pressure chamber and a fuel chamber, a pressure tank connected to said pressure chamber, a valve in the connection between said pressure tank and said pressure chamber, pressure gas filling means in said connection between said pressure tank and said pressure chamber on the side adjacent said pressure tank in respect to said valve, a discharge conduit connected from said fuel tank fuel chamber portion for delivery of fuel to a thrust gas producing device, liquid fuel filling means connected to said discharge conduit for filling the fuel chamber with liquid fuel, and valve means in said discharge conduit for preventing flow out of said discharge conduit when said filling means is being used.

10. In a space vehicle according to claim 3, wherein said thrust producing device includes a check valve permitting flow from said supply means to said device, but no flow in an opposite direction.

References Cited by the Examiner
UNITED STATES PATENTS

| | | |
|---|---|---|
| 2,621,719 | 12/1952 | Eaton et al. |
| 2,711,751 | 6/1955 | Sunley _____ 137—208 |
| 2,947,500 | 8/1960 | Dreyer et al. _____ 244—23 |
| 2,988,882 | 6/1961 | Hollings _____ 244—135 X |
| 3,048,011 | 8/1962 | Tumavicus _____ 244—52 X |
| 3,097,480 | 7/1963 | Sohn _____ 244—1 X |

MILTON BUCHLER, *Primary Examiner.*

FERGUS S. MIDDLETON, *Examiner.*